(12) United States Patent
Kim et al.

(10) Patent No.: US 10,816,870 B2
(45) Date of Patent: Oct. 27, 2020

(54) ACTIVE PRISM STRUCTURE AND FABRICATION METHOD THEREFOR

(71) Applicant: KYUNGPOOK NATIONAL UNIVERSITY INDUSTRY-ACADEMIC COOPERATION FOUNDATION, Daegu (KR)

(72) Inventors: Hak-Rin Kim, Daegu (KR); Min-Kyu Park, Daegu (KR)

(73) Assignee: KYUNGPOOK NATIONAL UNIVERSITY INDUSTRY-ACADEMIC COOPERATION FOUNDATION, Daegu (KR)

( * ) Notice: Subject to any disclaimer, the term of this patent is extended or adjusted under 35 U.S.C. 154(b) by 355 days.

(21) Appl. No.: 15/894,216

(22) Filed: Feb. 12, 2018

(65) Prior Publication Data
US 2018/0239215 A1 Aug. 23, 2018

(30) Foreign Application Priority Data
Feb. 23, 2017 (KR) .......................... 10-2017-0023895

(51) Int. Cl.
*G02F 1/29* (2006.01)

(52) U.S. Cl.
CPC .......... *G02F 1/293* (2013.01); *G02F 2202/40* (2013.01)

(58) Field of Classification Search
CPC .......... G02F 1/293; G02F 1/0126; G02F 1/01; G02F 1/19; G02F 1/29; G02F 2202/13;
(Continued)

(56) References Cited

U.S. PATENT DOCUMENTS

2016/0070113 A1* 3/2016 Travis .................. G02F 1/1323
349/18

FOREIGN PATENT DOCUMENTS

| KR | 20020037443 | 5/2002 |
| KR | 20070026085 | 3/2007 |
| KR | 20140140661 | 12/2014 |

OTHER PUBLICATIONS

Shang, et al., Electrically Controllable Liquid Crystal Component for Efficient Light Steering, IEEE Photonics Journal, 2015, pp. 1-14.
(Continued)

*Primary Examiner* — Collin X Beatty
*Assistant Examiner* — Grant A Gagnon
(74) *Attorney, Agent, or Firm* — Cantor Colburn LLP

(57) ABSTRACT

An active prism structure includes: an isotropic layer made of a photocurable isotropic polymer having a predetermined refractive index $n_p$ and stacked on a substrate; and a birefringent layer made of a birefringent material having an ordinary refractive index $n_o$ and an extraordinary refractive index $n_e$ and stacked on the isotropic layer, an interface between the isotropic layer and the birefringent layer is formed in a prism shape, and refractive index differences occurring at the interface between the isotropic layer and the birefringent layer are different according to a polarization direction of incident light. The active prism structure is configured such that the refractive index differences are different according to the polarization direction of the incident light, and thus, it is possible to change a refraction angle and refraction direction of the prism by controlling the polarization direction of the incident light.

11 Claims, 10 Drawing Sheets

(58) Field of Classification Search
CPC .. G02F 2203/10; G02F 1/0009; G02F 1/0102; G02F 1/0147; G02F 1/061; G02F 2202/30; G02F 2202/025; G02F 2203/13; G02F 1/0018; G02F 1/0063; G02F 1/011; G02F 1/015; G02F 1/292; G02F 1/31; G02F 1/33; G02F 1/365; G02F 2001/133614; G02F 2001/291; G02F 2201/08; G02F 2202/10; G02F 2202/32; G02F 1/00; G02F 1/0123; G02F 1/017; G02F 1/0311; G02F 1/0327; G02F 1/035; G02F 1/065; G02F 1/113; G02F 1/1303; G02F 1/133555; G02F 1/1336; G02F 1/133602; G02F 1/1337; G02F 1/17; G02F 1/218; G02F 1/225; G02F 1/2255; G02F 1/3501; G02F 1/3511; G02F 1/3515; G02F 1/3517; G02F 1/3556; G02F 1/3611; G02F 1/3614; G02F 1/3617; G02F 1/377; G02F 2001/0152; G02F 2001/0155; G02F 2001/212; G02F 2001/213; G02F 2001/3505; G02F 2001/3507; G02F 2001/354; G02F 2001/3546; G02F 2001/374; G02F 2201/122; G02F 2201/16; G02F 2202/022; G02F 2202/36; G02F 2202/38; G02F 2203/02; G02F 2203/05; G02F 2203/12; G02F 2203/24; G02F 2203/25; G02F 2203/28; G02F 2203/48; G02F 2203/56; G02F 2203/58; G02F 2203/60
USPC .......................................................... 359/299
See application file for complete search history.

(56) References Cited

OTHER PUBLICATIONS

Son, et al., Polarilization-Dependent Microlens Array Using Reactive Mesogen Aligned by Top-Down Nanogrooves for Switchable Three-Dimensional Applications, Journal of Optical Society of Korea, 2015, pp. 265-271.

\* cited by examiner

FIG. 8
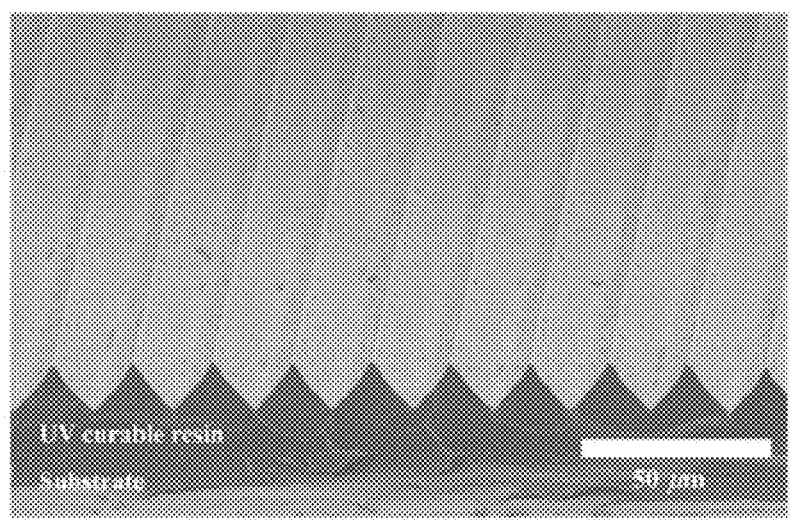
(a)
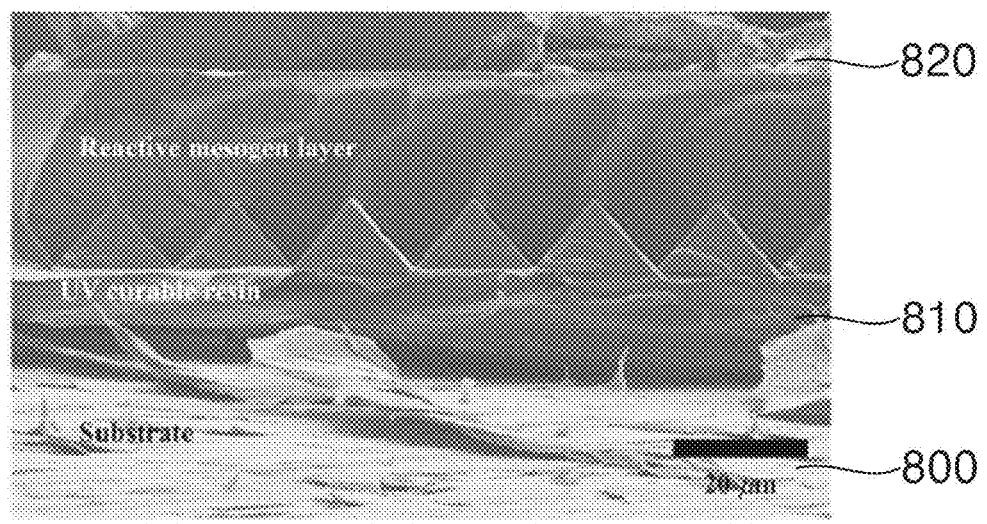
(b)

FIG. 9
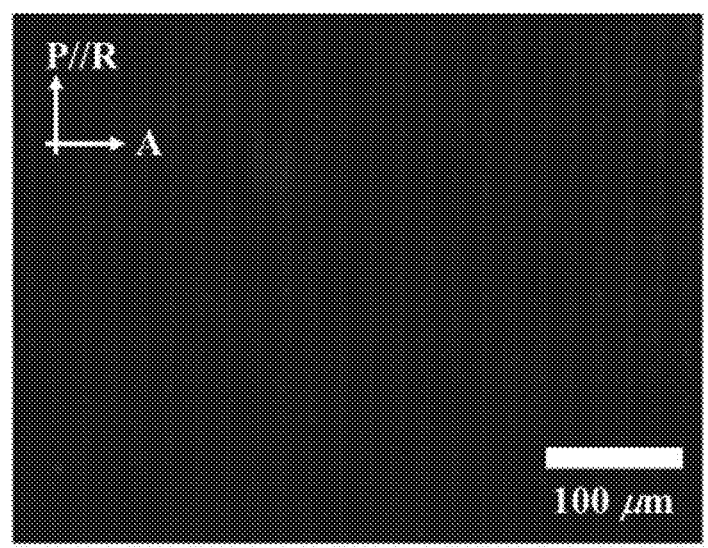
(a)
(b)

FIG. 10
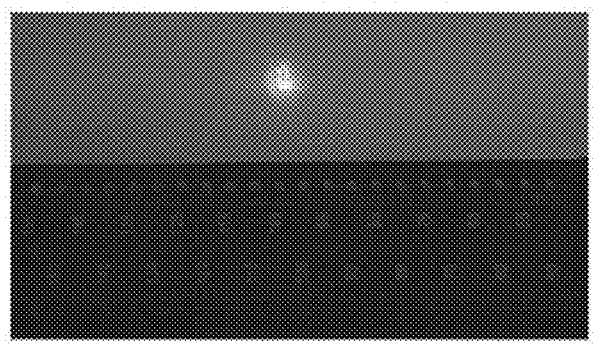
(a) < 0° Polarization >
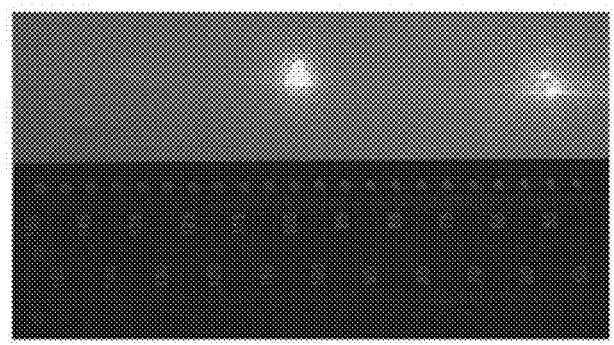
(b) < 45° Polarization >
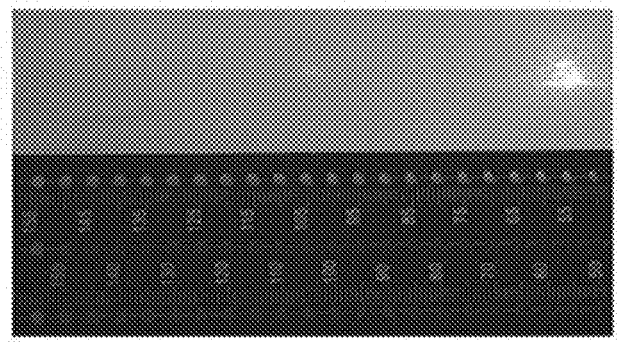
(c) < 90° Polarization >

ACTIVE PRISM STRUCTURE AND FABRICATION METHOD THEREFOR

BACKGROUND OF THE INVENTION

1. Field of the Invention

The present invention relates to an active prism structure and a method of fabricating the same, and more particularly, to an active prism structure and a fabricating method thereof capable of selectively turning on/off a prism function or changing a refraction angle and a refraction direction in a prism by controlling a polarization direction of incident light.

2. Description of the Related Art

In general, a prism is an optical element used to disperse or refract incident light. In recent years, various types of display apparatuses and three-dimensional stereoscopic display apparatuses have been studied and developed, and prism array sheets have been used for various purposes in such display apparatuses.

A prism sheet is installed on the front of a display apparatus to improve display brightness of the display apparatus by limiting or scattering the direction of light emitted from the display apparatus.

However, in the related art, the prism sheet have a limit point in that incident light is emitted in a single refraction direction at a refraction angle defined according to an inclination angle of the prism and an refractive index of a material of the prism.

SUMMARY OF THE INVENTION

The present invention is to provide an active prism structure capable of selectively turning a prism function on and off or changing a refraction direction and a refraction angle by controlling a polarization direction of an incident light.

The present invention is also to provide a method of fabricating the above-described active prism structure by using imprinting technique.

According to an aspect of the present invention, there is provided an active prism structure including: a substrate made of a transparent material; an isotropic layer made of a photocurable isotropic polymer having a predetermined refractive index $n_p$ and stacked on the substrate; and a birefringent layer made of a birefringent material having an ordinary refractive index $n_o$ and an extraordinary refractive index $n_e$ and stacked on the isotropic layer, wherein an interface between the isotropic layer and the birefringent layer is formed in a prism shape, and wherein a refractive index difference occurring at the interface between the isotropic layer and the birefringent layer is different according to a polarization direction of incident light.

According to a second aspect of the present invention, there is provided an active prism structure including: a substrate made of a transparent material; an isotropic layer made of a photocurable isotropic polymer having a predetermined refractive index $n_p$ and stacked on the substrate; and a birefringent layer made of a birefringent material having an ordinary refractive index $n_o$ and an extraordinary refractive index $n_e$ and stacked on the isotropic layer, wherein an interface between the isotropic layer and the birefringent layer is formed in a prism shape, and wherein the isotropic layer is made of a photocurable isotropic polymer having a refractive index $n_p$ equal to the ordinary refractive index of the birefringent layer, and thus, it is possible to selectively turn on/off a prism function by controlling a polarization direction of incident light.

According to a third aspect of the present invention, there is provided an active prism structure including: a substrate made of a transparent material; an isotropic layer made of a photocurable isotropic polymer having a predetermined refractive index $n_p$ and stacked on the substrate; and a birefringent layer made of a birefringent material having an ordinary refractive index $n_o$ and an extraordinary refractive index $n_e$ and stacked on the isotropic layer, wherein an interface between the isotropic layer and the birefringent layer is formed in a prism shape, and wherein the isotropic layer is made of a photocurable isotropic polymer having a refractive index $n_p$ different from an ordinary refractive index of the birefringent layer and an extraordinary refractive index of the birefringent layer, and thus, it is possible to change a refraction angle and a refraction direction of the prism by controlling a polarization direction of incident light.

In the active prism structure according to any one of the first to third aspects, it is preferable that the birefringent layer is made of a birefringent liquid crystal or a photocurable liquid crystalline phase polymer (reactive mesogen).

In the active prism structure according to any one of the first to third aspects, it is preferable that the active prism structure further includes a lower alignment film formed at the interface between the birefringent layer and the isotropic layer, wherein a material constituting the birefringent layer is aligned in a unidirectional manner by the lower alignment film.

In the active prism structure according to the first to third aspects, it is preferable that the active prism structure further includes an upper transparent substrate stacked on a surface of the birefringent layer, wherein an upper alignment film is formed on one surface of the upper transparent substrate being in contact with birefringent layer, and wherein a material constituting the birefringent layer is aligned in a unidirectional manner by the upper alignment film.

In the active prism structure according to the first to third aspects, it is preferable that the prism formed at the interface between the isotropic layer and the birefringent layer is configured as a single prism or a prism array; and the prism is configured to have a triangular shape such as a right triangle, an equilateral triangle, or an isosceles triangle or a Fresnel prism shape.

According to a fourth aspect of the present invention, there is provided a method of fabricating an active prism structure, including: (a) forming an isotropic layer on a first transparent substrate by depositing an isotropic polymer on the first transparent substrate, pressing the deposited isotropic polymer by using a prism template having a reversed prism shape, photocuring the pressed isotropic polymer, and removing the prism template; (b) forming a lower alignment film for bottom-up alignment on the surface of the isotropic layer by coating an alignment material on a surface of the isotropic layer and performing rubbing; (c) forming an upper substrate having an upper alignment film for top-down alignment by coating an alignment material on a second transparent substrate and performing rubbing; and (d) forming a birefringent layer by arranging the upper substrate above the lower alignment film on the first transparent substrate, injecting a photocurable liquid crystalline phase polymer between the lower alignment film and the upper alignment film, and performing photocuring, wherein an interface between the isotropic layer and the birefringent layer is configured to have a prism shape, and the isotropic polymer and photocurable liquid crystalline phase polymer are set so that a refractive index difference occurring at the interface between the isotropic layer and the birefringent layer is different according to a polarization direction of incident light.

In the method of fabricating an active prism structure according to the fourth aspect, it is preferable that the method further includes (e) separating and removing the upper substrate having the upper alignment film from the birefringent layer.

In the method of fabricating an active prism structure according to the fourth aspect, it is preferable that the (b) forming the lower alignment film further includes a process of UVO-treating the surface of the isotropic layer before coating the alignment material on the surface of the isotropic layer, so that coatability of the alignment material in post processes is improved.

An active prism structure according to the present invention is fabricated by using a photocurable isotropic polymer and an imprinting technique, so that it is possible to selectively turn on/off a prism function or to change a refraction angle and refraction direction of the prism by controlling a polarization direction of incident light.

In particular, an active prism structure according to an embodiment of the present invention is configured such that a refractive index of an isotropic layer is equal to an ordinary refractive index of a birefringent layer, so that it is possible to selectively turn on/off a prism function by controlling a polarization direction of incident light.

In addition, an active prism structure according to another embodiment of the present invention is configured such that a refractive index of an isotropic layer is different from an ordinary refractive index and an extraordinary refractive index of a birefringent layer, so that it is possible to change a refraction angle and refraction direction of the prism by controlling a polarization direction of incident light.

BRIEF DESCRIPTION OF THE DRAWINGS

FIG. 8 (a) is a SEM image of an isotropic prism array structure formed by an imprinting process according to the fabricating method according to the present invention, and (b) is a SEM image of a cross section of an active prism structure formed by the fabricating method according to the present invention;

FIG. 9 is microscope images observed on a crossed polarizer in an active prism structure according to the present invention; and FIG. 10 is photographs illustrating traveling paths of light after passing through a Fresnel type active prism structure according to the present invention according to polarization of incident light in the Fresnel type active prism structure.

DETAILED DESCRIPTION OF THE PREFERRED EMBODIMENTS

An active prism structure according to the present invention is configured such that refractive index differences occurring at an interface between an isotropic layer and a birefringent layer with respect to incident light are different according to the polarization direction of the incident light, so that it is possible to selectively turn on/off a prism function or to change a refraction angle and refraction direction of the prism by controlling a polarization direction of the incident light.

Hereinafter, a structure and operations of an active prism structure according to preferred embodiments of the present invention will be described in detail with reference to the accompanying drawings.

First Embodiment

Figure 1:
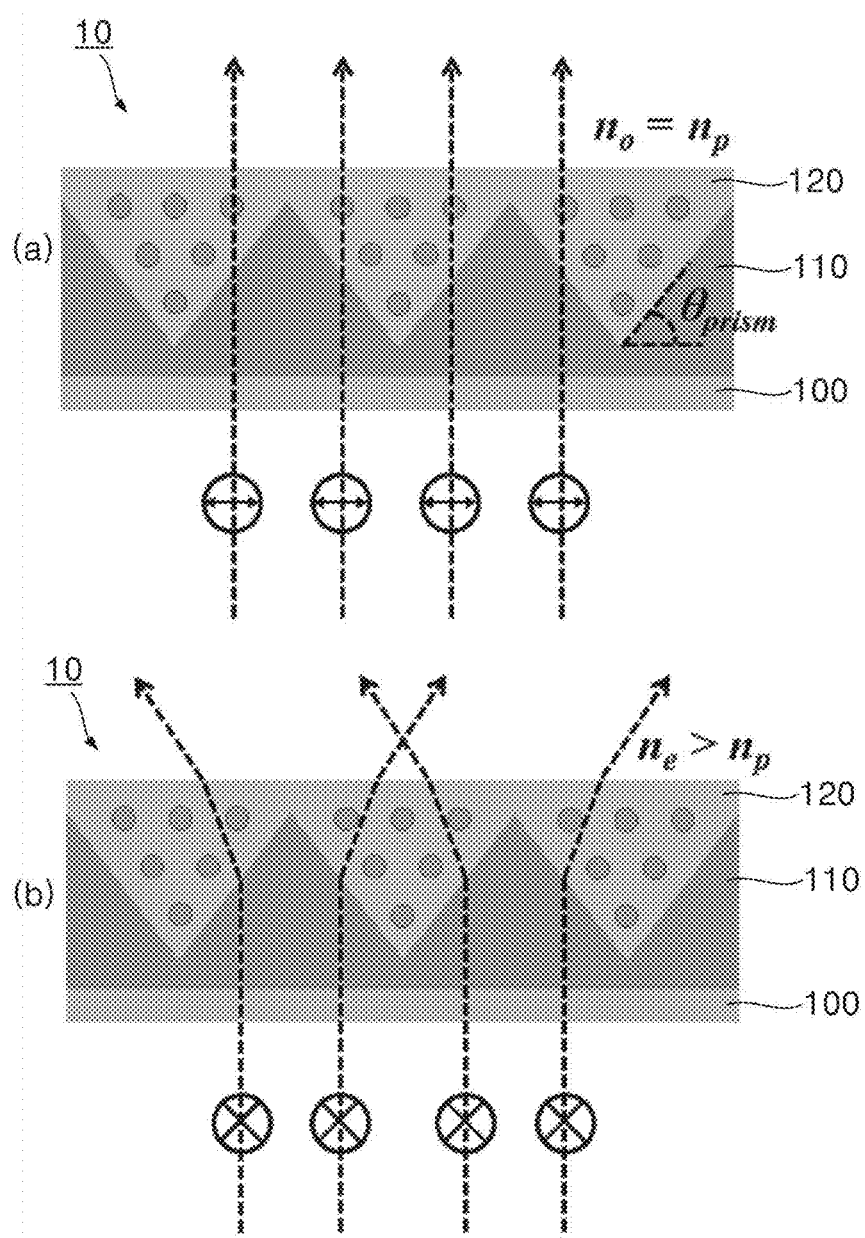
FIG. 1 illustrates the structure and operation principle of the active prism structure according to the first embodiment of the present invention, (a) of FIG. 1 illustrates refraction in the case where a polarization direction of incident light is perpendicular to an alignment direction of a birefringent layer, and (b) of FIG. 1 illustrates refraction in the case where the polarization direction of the incident light is coincident with the alignment direction of the birefringent layer.

Hereinafter, a structure and operations of an active prism structure according to a first embodiment of the present invention will be described in detail with reference to (a) and (b) of FIG. 1. (a) and (b) of FIG. 1 illustrate the structure and operation principle of the active prism structure according to the first embodiment of the present invention. (a) of FIG. 1 illustrates refraction in the case where a polarization direction of incident light is perpendicular to an alignment direction of a birefringent layer, and (b) of FIG. 1 illustrates refraction in the case where the polarization direction of the incident light is coincident with the alignment direction of the birefringent layer.

Referring to (a) and (b) of FIG. 1, an active prism structure 10 according to this embodiment of the present invention includes a transparent substrate 100, an isotropic layer 110, and a birefringent layer 120. The active prism structure 10 according to the present invention is configured such that an interface between the isotropic layer and the birefringent layer is formed in a prism array shape, and refractive index differences occurring at the interface between the isotropic layer and the birefringent layer with respect to the incident light are different according to a polarization direction of the incident light.

The isotropic layer 110 is made of a photocurable isotropic polymer having a predetermined refractive index $n_p$ and is stacked on the substrate.

The birefringent layer 120 is made of a birefringent material having an ordinary refractive index $n_o$ and an extraordinary refractive index $n_e$ and is stacked on the isotropic layer. A prism formed at the interface between the isotropic layer and the birefringent layer may be configured as a single prism or a prism array, and the prism may be configured to have a triangular shape such as an equilateral triangle or an isosceles triangle. That is, the prism is configured to have a triangular shape such as an equilateral triangle or an isosceles triangle made of inclined planes inclined at a predetermined prism angle $\theta_{prism}$ with respect to a flat emission surface, and the prisms are repeatedly arranged to realize a prism array shape. It is preferable that the birefringent layer is made of a birefringent liquid crystal (LC) or a photocurable liquid crystalline phase polymer (reactive mesogen) that is aligned in a unidirectional manner.

In order to align the liquid crystal or photocurable liquid crystalline phase polymer constituting the birefringent layer in a unidirectional manner, the active prism structure 10 may further include a lower alignment film (not shown) at the interface between isotropic layer 110 and the birefringent layer 120 to align a medium of the birefringent layer in a bottom-up method; the active prism structure 10 may further include an upper alignment film (not shown) on the upper surface of the birefringent layer 120 to align a medium of the birefringent layer in a top-down method; and the active prism structure 10 may further include an upper alignment film and a lower alignment film on the upper and lower surfaces of the birefringent layer 120, respectively, to simultaneously align a medium of the birefringent layer in a bottom-up method and a top-down method, so that it is possible to more accurately align the medium of the birefringent layer in a unidirectional manner.

By the upper alignment film and/or the lower alignment film, the medium constituting the birefringent layer is aligned in a unidirectional manner.

In the active prism structure according to the present invention, by setting the relationship among the refractive index $n_p$ of the isotropic layer 110, the ordinary refractive index $n_o$ of the birefringent layer 120 which is a refractive index in the direction perpendicular to the alignment direction, and the extraordinary refractive index $n_e$ of the birefringent layer 120 which is a refractive index in the alignment direction so as to be $n_o = n_p < n_e$, it is possible to determine turn on/off a prism function according to the polarization direction of the incident light. Accordingly, it is preferable that the active prism structure according to the present invention is configured so as to be capable of selectively turning on/off the prism function by controlling the polarization direction of the incident light.

Referring to (a) of FIG. 1, when light having directionality is incident on the active prism structure according to this embodiment, in the case where the polarization direction of the incident light is perpendicular to the alignment direction of the birefringent layer 120, the birefringent layer 120 has a refractive index of no, and since $n_o = n_p$, the incident light goes straight without refraction. As a result, in the case where light having a polarization direction perpendicular to the alignment direction of the birefringent layer is incident on the active prism structure according to this embodiment, the active prism structure does not operate as a prism to make the incident light pass without refraction.

Referring to (b) of FIG. 1, when light having directionality is incident on the active prism structure according to this embodiment, in the case where the polarization direction of the incident light is coincident with the alignment direction of the birefringent layer 120, the birefringent layer 120 has a refractive index of $n_e$, and since $n_p < n_e$, the incident light is refracted by the refractive index difference at the interface between the isotropic layer 110 and the birefringent layer 120. As a result, in the case where light having a polarization direction coincident with the alignment direction of the birefringent layer is incident on the active prism structure according to this embodiment, the active prism structure operates as a prism array so that the incident light disperses. Therefore, in the active prism structure according to this embodiment, if the polarization direction of the incident light is perpendicular to the alignment direction of the birefringent layer, the prism function is turned off, and if the polarization direction of the incident light is coincident with the alignment direction of the birefringent layer, the prism function is turned on.

In the active prism structure according to this embodiment, even in the case where light in a Lambertian form is incident on the active prism structure, if the polarization direction of the light is perpendicular to the alignment direction of the birefringent layer, the incident light goes straight without refraction, and if the polarization direction of the light is coincident with the alignment direction of the birefringent layer, the active prism structure operates as a prism array, so that the incident light is emitted in a form with the viewing angle being reduced.

Second Embodiment

Figure 2:
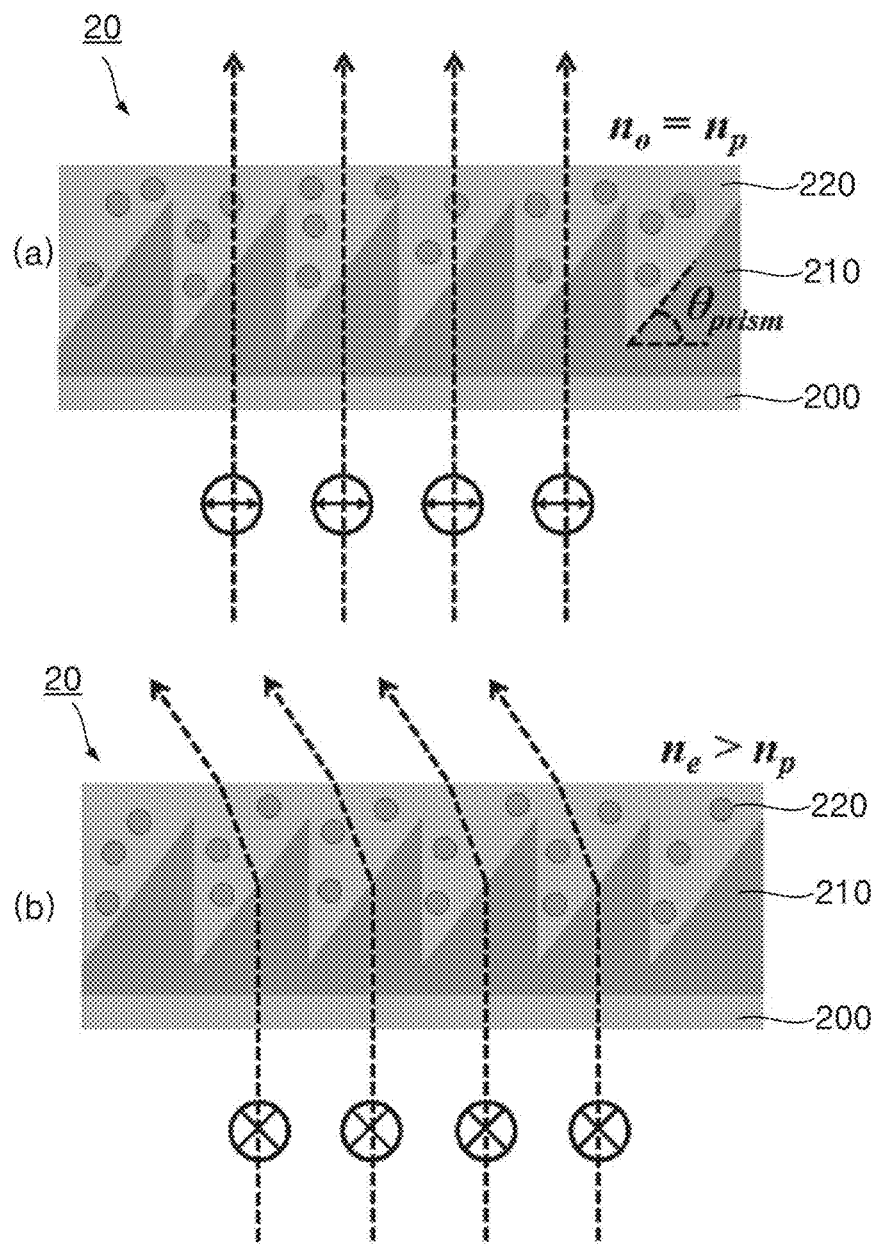
FIG. 2 illustrates a structure and operation principle of an active prism structure according to a second embodiment of the present invention, (a) of FIG. 2 illustrates refraction in the case where a polarization direction of incident light is perpendicular to an alignment direction of a birefringent layer, and (b) of FIG. 2 illustrates refraction in the case where the polarization direction of the incident light is coincident with the alignment direction of the birefringent layer.

Hereinafter, a structure and operations of an active prism structure according to a second embodiment of the present invention will be described in detail with reference to (a) and (b) of FIG. 2. (a) and (b) of FIG. 2 illustrate the structure and operation principle of the active prism structure according to the second embodiment of the present invention. (a) of FIG. 2 illustrates refraction in the case where a polarization direction of incident light is perpendicular to an alignment direction of a birefringent layer, and (b) of FIG. 2 illustrates refraction in the case where the polarization direction of the incident light is coincident with the alignment direction of the birefringent layer.

Referring to (a) and (b) of FIG. 2, an active prism structure 20 according to this embodiment includes a transparent substrate 200, an isotropic layer 210, and a birefringent layer 220. In the active prism structure 20 according to the present invention, the interface between the isotropic layer and the birefringent layer is configured to have a prism shape. The interface between the isotropic layer and the birefringent layer is configured such that the refractive index difference occurring at the interface between the isotropic layer and the birefringent layer is different according to the polarization direction of the incident light.

It is preferable that the isotropic layer 210 and the birefringent layer 220 are made of the same material as those of the first embodiment and the interface between the isotropic layer and the birefringent layer is formed in a right triangular shape of a prism or a Fresnel prism shape. The prism can be configured in a single prism shape or in a prism array shape.

The Fresnel prism is configured to have a serrated shape including an inclined surface inclined at a predetermined prism angle $\theta_{prism}$ with respect to a flat emission surface and a non-inclined surface. These prisms are repeatedly arranged to have a form of sawtooth waves, so that a Fresnel prism array is implemented. In order to align the liquid crystal or photocurable liquid crystalline phase polymer constituting the birefringent layer in a unidirectional manner, the active prism structure 20 may further include a lower alignment film (not shown) at the interface between isotropic layer 210 and the birefringent layer 220; the active prism structure 20 may further include an upper alignment film (not shown) on the upper surface of the birefringent layer 220; or the active prism structure 20 may further include an upper alignment film and an lower alignment film on the upper and lower surfaces of the birefringent layer 220, respectively. By the upper alignment film and/or the lower alignment film, the medium constituting the birefringent layer is aligned in a unidirectional manner.

In the active prism structure according to this embodiment, by setting the relationship among the refractive index $n_p$ of the isotropic layer 210, the ordinary refractive index $n_o$ of the birefringent layer 220 which is a refractive index in the direction perpendicular to the alignment direction, and the extraordinary refractive index $n_e$ of the birefringent layer 220 which is a refractive index in the alignment direction so as to be $n_o=n_p<n_e$, it is possible to selectively turn on/off a prism function or to change a traveling path of incident light by controlling the polarization direction of the incident light.

Referring to (a) of FIG. 2, when light having directionality is incident on the active prism structure according to this embodiment, in the case where the polarization direction of the incident light is perpendicular to the alignment direction of the birefringent layer 220, the birefringent layer 220 has a refractive index of $n_o$, and since $n_o=n_p$, the incident light goes straight without refraction. As a result, in the case where light having a polarization direction perpendicular to the alignment direction of the birefringent layer is incident on the active prism structure according to this embodiment, the prism does not operate as a prism, and the incident light goes straight without refraction.

Referring to (b) of FIG. 2, when light having directionality is incident on the active prism structure according to this embodiment, in the case where the polarization direction of the incident light is coincident with the alignment direction of the birefringent layer 120, the birefringent layer 120 has a refractive index of $n_e$, and since $n_p<n_e$, the incident light is refracted by the refractive index difference at the interface between the isotropic layer 210 and the birefringent layer 220. As a result, in the active prism structure according to this embodiment, in the case where light having a polarization direction coincident with the alignment direction of the birefringent layer is incident on the active prism structure according to this embodiment, the active prism structure operates as a prism array, so that the traveling path is refracted.

Therefore, in the active prism structure according to this embodiment, if the polarization direction of the incident light is perpendicular to the alignment direction of the birefringent layer, the prism function is turned off, and if the polarization direction of the incident light is coincident with the alignment direction of the birefringent layer, the prism function is turned on.

Third Embodiment

Figure 3:
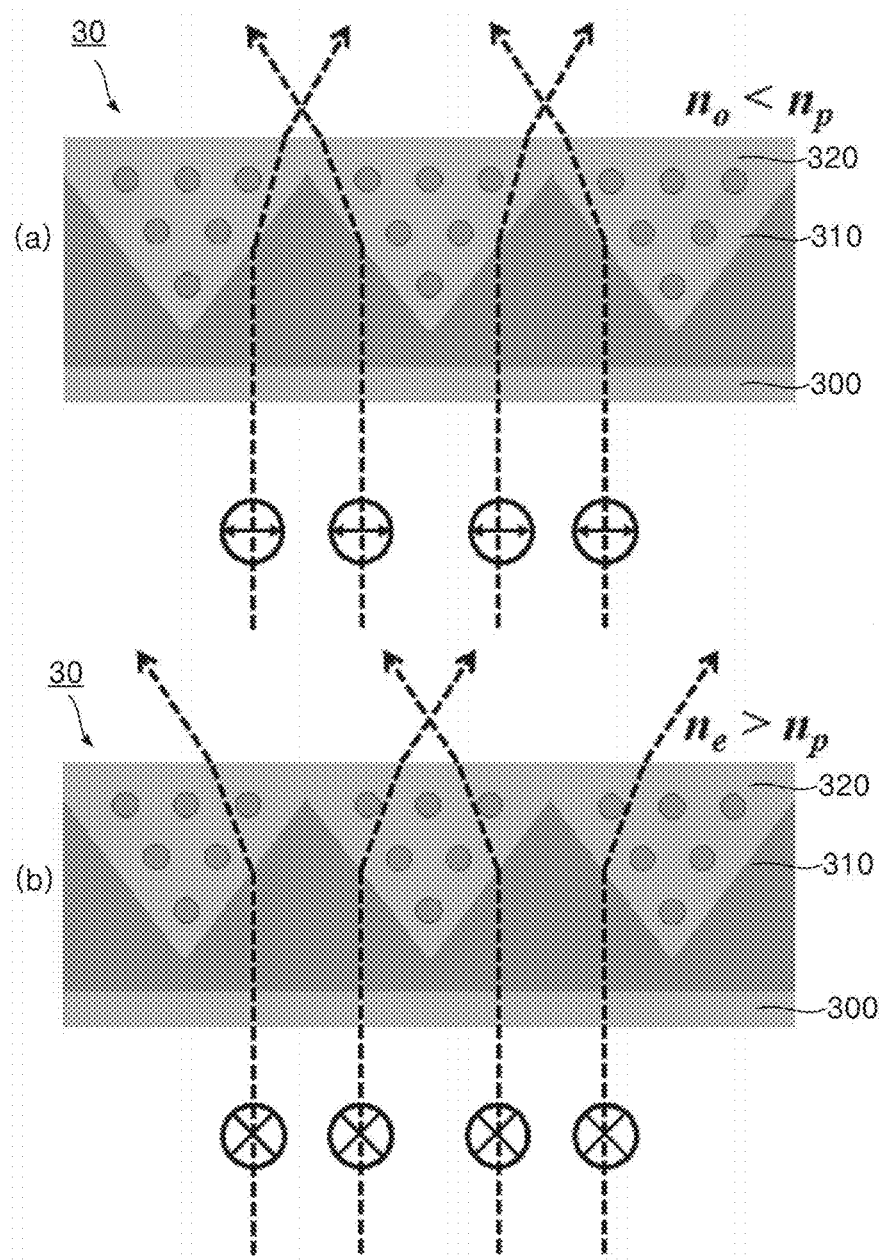
FIG. 3 illustrates a structure and operation principle of an active prism structure according to a third embodiment of the present invention, (a) of FIG. 3 illustrates refraction in the case where a polarization direction of incident light is perpendicular to an alignment direction of a birefringent layer, and (b) of FIG. 3 illustrates refraction in the case where the polarization direction of the incident light is coincident with the alignment direction of the birefringent layer.

Hereinafter, a structure and operations of an active prism structure according to a third embodiment of the present invention will be described in detail with reference to (a) and (b) of FIG. 3. (a) and (b) of FIG. 3 illustrate the structure and operation principle of the active prism structure according to the third embodiment of the present invention. (a) of FIG. 3 illustrates refraction in the case where a polarization direction of incident light is perpendicular to an alignment direction of a birefringent layer, and (b) of FIG. 3 illustrates refraction in the case where the polarization direction of the incident light is coincident with the alignment direction of the birefringent layer.

Referring to (a) and (b) of FIG. 3, an active prism structure 30 according to this embodiment includes a transparent substrate 300, an isotropic layer 310, and a birefringent layer 320. In the active prism structure (30) according to the present invention, the interface between the isotropic layer and the birefringent layer is configured to have a prism shape. The interface between the isotropic layer and the birefringent layer is configured such that the refractive index difference occurring at the interface between the isotropic layer and the birefringent layer is different according to the polarization direction of the incident light.

The structures and materials of the isotropic layer 310 and the birefringent layer 320 are the same as those of the first embodiment. However, it is preferable that, by setting the relationship among the refractive index $n_p$ of the isotropic layer 310, the ordinary refractive index $n_o$ of the birefringent layer 320 which is a refractive index in the direction perpendicular to the alignment direction, and the extraordinary refractive index $n_e$ of the birefringent layer 320 which is a refractive index in the alignment direction so as to be $n_o<n_p<n_e$, the refraction directions in the prism structure are opposite to each other according to the polarization direction of the incident light.

In order to align the liquid crystal or photocurable liquid crystalline phase polymer constituting the birefringent layer in a unidirectional manner, it is preferable that the active prism structure 30 further includes a lower alignment film and/or an upper alignment film similarly to the first embodiment, and by the upper alignment film and/or the lower alignment film, the medium constituting the birefringent layer is aligned in a unidirectional manner.

Referring to (a) of FIG. 3, when light having directionality is incident on the active prism structure according to this embodiment, in the case where the polarization direction of the incident light is perpendicular to the alignment direction of the birefringent layer 320, the birefringent layer 320 has a refractive index of $n_o$, and since $n_o<n_p$, the incident light is refracted by the refractive index difference at the interface between the isotropic layer 310 and the birefringent layer 320, and thus, the active prism structure operates as a prism array so that the incident light disperses.

Referring to (b) of FIG. 3, when light having directionality is incident on the active prism structure according to this embodiment, in the case where the polarization direction of the incident light is coincident with the alignment direction of the birefringent layer 320, the birefringent layer 320 has a refractive index of $n_e$, and since $n_p<n_e$, the incident light is refracted by the refractive index difference at the interface between the isotropic layer 310 and the birefringent layer 320. As a result, in the case where light having a polarization direction coincident with the alignment direction of the birefringent layer is incident on the active prism structure according to this embodiment, the active prism structure operates as a prism array so that the incident light disperses.

However, in the active prism structure according to this embodiment, the refraction direction in the case where the polarization direction of the incident light is perpendicular to the alignment direction of the birefringent layer and the refraction direction in the case where the polarization direction of the incident light in coincident with the alignment direction of the birefringent layer are opposite to each other. Therefore, the active prism structure according to this embodiment is characterized in that the refraction directions in the active prism structure are opposite to each other according to the polarization direction of the incident light.

Fourth Embodiment

Figure 4:
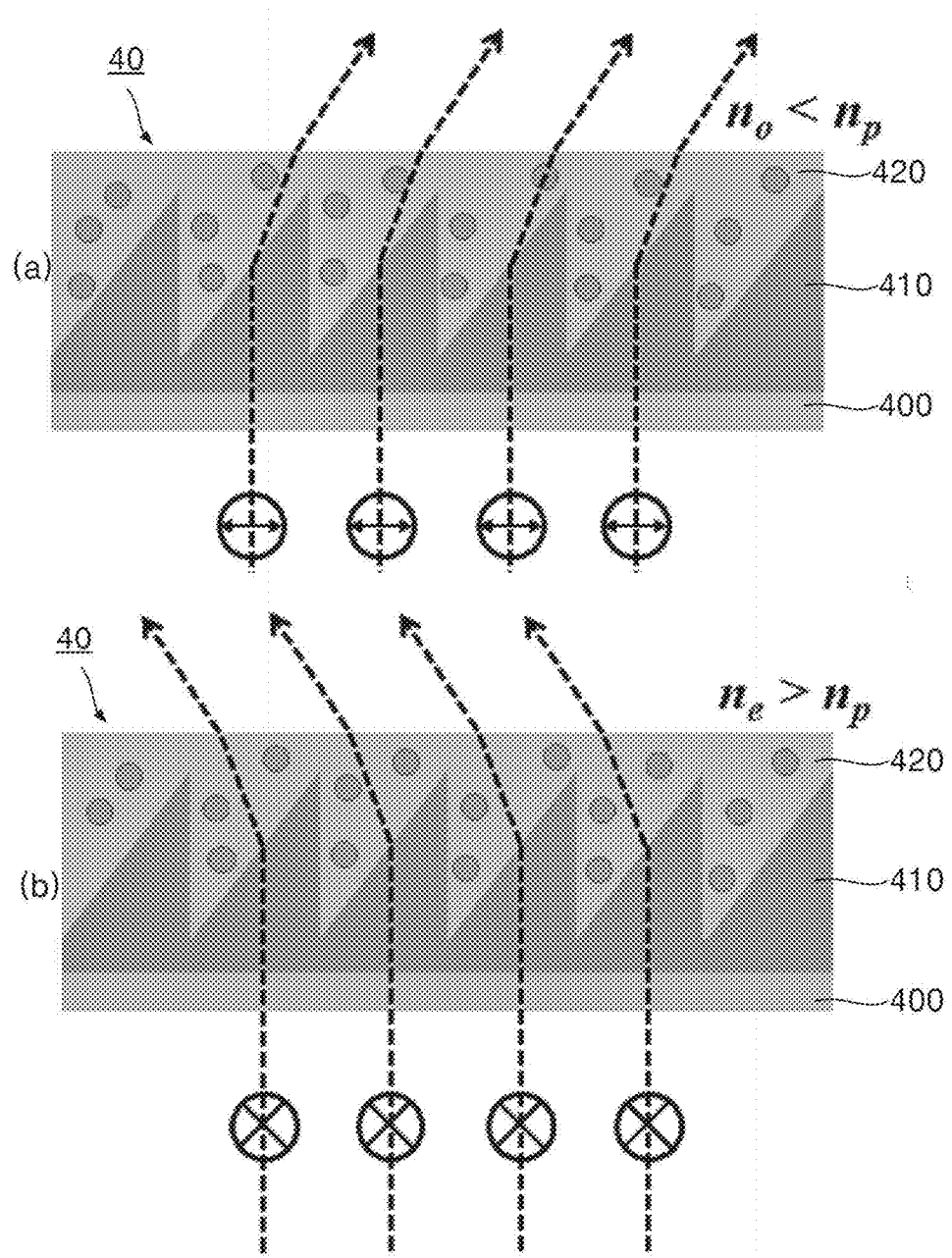
FIG. 4 illustrates a structure and operation principle of an active prism structure according to a fourth embodiment of the present invention, (a) of FIG. 4 illustrates refraction in the case where a polarization direction of incident light is perpendicular to an alignment direction of a birefringent layer, and (b) of FIG. 4 illustrates refraction in the case where the polarization direction of the incident light is coincident with the alignment direction of the birefringent layer.

Hereinafter, a structure and operations of an active prism structure according to a fourth embodiment of the present invention will be described in detail with reference to (a) and (b) of FIG. 4. (a) and (b) of FIG. 4 illustrate the structure and operation principle of the active prism structure according to the fourth embodiment of the present invention. (a) of FIG. 4 illustrates refraction in the case where a polarization direction of incident light is perpendicular to an alignment direction of a birefringent layer, and (b) of FIG. 4 illustrates refraction in the case where the polarization direction of the incident light is coincident with the alignment direction of the birefringent layer.

Referring to (a) and (b) of FIG. 4, an active prism structure 40 according to this embodiment includes a transparent substrate 400, an isotropic layer 410, and a birefringent layer 420.

In the active prism structure 40 according to the present invention, the interface between the isotropic layer and the birefringent layer is configured to have a prism shape. The interface between the isotropic layer and the birefringent layer is configured such that the refractive index difference occurring at the interface between the isotropic layer and the birefringent layer is different according to the polarization direction of the incident light.

The structures and materials of the isotropic layer 410 and the birefringent layer 420 are the same as those of the third embodiment. It is preferable that the interface between the isotropic layer and the birefringent layer is preferably formed in a right triangular shape or a Fresnel prism shape. The interface can be configured as a single prism or as a Fresnel prism array. It is preferable that, by setting the relationship among the refractive index $n_p$ of the isotropic layer 310, the ordinary refractive index $n_o$ of the birefringent layer 320 which is a refractive index in the direction perpendicular to the alignment direction, and the extraordinary refractive index $n_e$ of the birefringent layer 320 which is a refractive index in the alignment direction so as to be $n_o<n_p<n_e$, the refraction directions in the prism structure are opposite to each other according to the polarization direction of the incident light.

In order to align the liquid crystal or photocurable liquid crystalline phase polymer constituting the birefringent layer in a unidirectional manner, it is preferable that the active prism structure 40 further includes a lower alignment film and/or an upper alignment film similarly to the first embodiment, and by the upper alignment film and/or the lower alignment film, the medium constituting the birefringent layer is aligned in a unidirectional manner.

Referring to (a) of FIG. 4, when light having directionality is incident on the active prism structure according to this embodiment, in the case where the polarization direction of the incident light is perpendicular to the alignment direction of the birefringent layer 420, the birefringent layer 420 has a refractive index of $n_o$, and since $n_o<n_p$, the incident light is refracted by the refractive index difference at the interface between the isotropic layer 410 and the birefringent layer 420, and thus, the active prism structure operates as a prism array so that the incident light disperses.

Referring to (b) of FIG. 4, when light having directionality is incident on the active prism structure according to this embodiment, in the case where the polarization direction of the incident light is coincident with the alignment direction of the birefringent layer 420, the birefringent layer 420 has a refractive index of ne, and since $n_p<$ne, the incident light is refracted by the refractive index difference at the interface between the isotropic layer 410 and the birefringent layer 420. As a result, in the case where light having a polarization direction coincident with the alignment direction of the birefringent layer is incident on the active prism structure according to this embodiment, the active prism structure operates as a prism array so that the incident light disperses.

However, in the active prism structure according to this embodiment, the refraction direction in the case where the polarization direction of the incident light is perpendicular to the alignment direction of the birefringent layer and the refraction direction in the case where the polarization direction of the incident light in coincident with the alignment direction of the birefringent layer are opposite to each other. Therefore, the active prism structure according to this embodiment is characterized in that the refraction directions in the active prism structure are opposite to each other according to the polarization direction of incident light.

Fifth Embodiment

Figure 5:
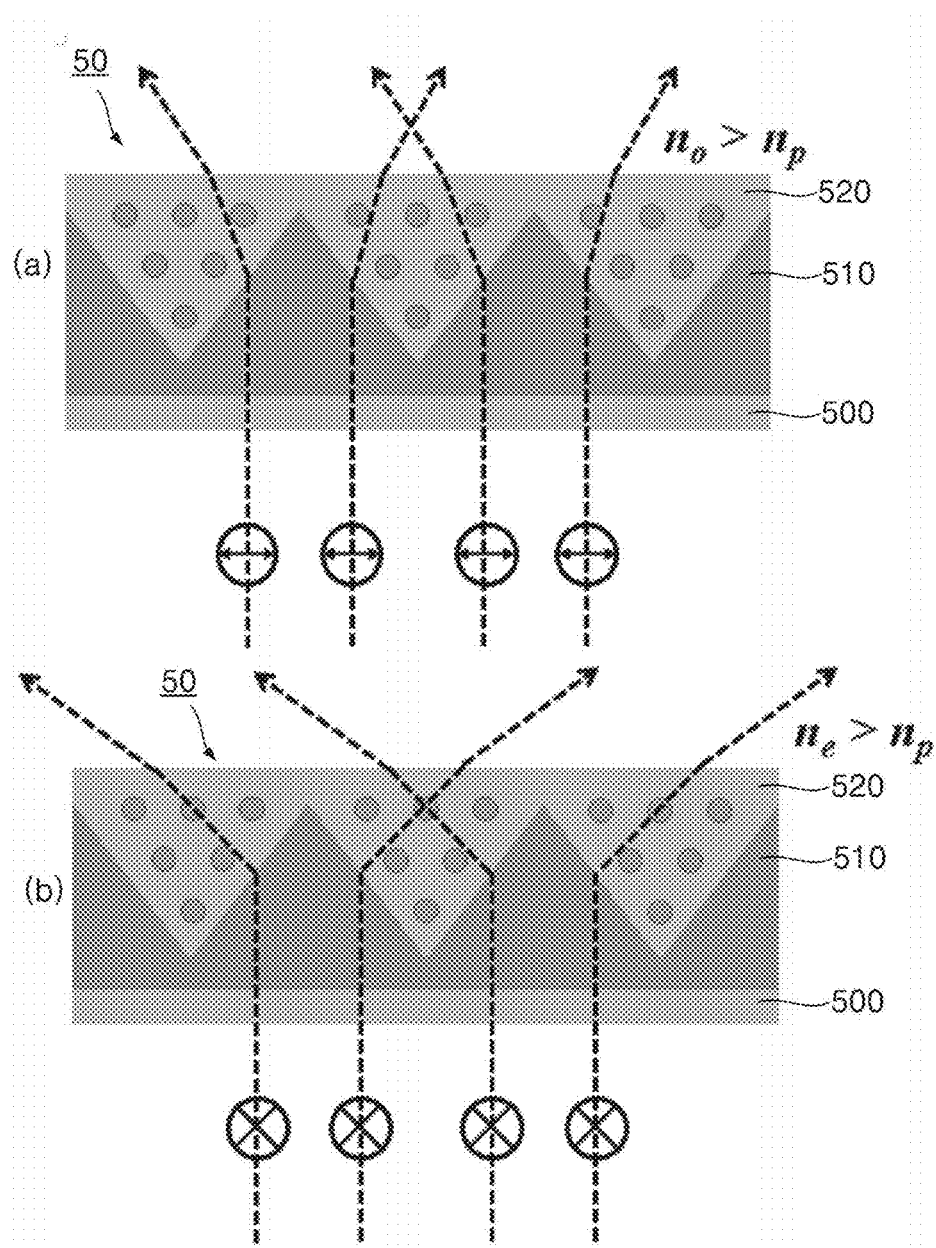
FIG. 5 illustrates a structure and operation principle of an active prism structure according to a fifth embodiment of the present invention, (a) of FIG. 5 illustrates refraction in the case where a polarization direction of incident light is perpendicular to an alignment direction of a birefringent layer, and (b) of FIG. 5 illustrates refraction in the case where the polarization direction of the incident light is coincident with the alignment direction of the birefringent layer.

Hereinafter, a structure and operations of the active prism structure according to the fifth embodiment of the present invention will be described in detail with reference to (a) and (b) of FIG. 5. (a) and (b) of FIG. 5 illustrate the structure and operation principle of the active prism structure according to the fifth embodiment of the present invention. (a) of FIG. 5 illustrates refraction in the case where a polarization direction of incident light is perpendicular to an alignment direction of a birefringent layer, and (b) of FIG. 5 illustrates refraction in the case where the polarization direction of the incident light is coincident with the alignment direction of the birefringent layer.

Referring to (a) and (b) of FIG. 5, an active prism structure 50 according to this embodiment includes a transparent substrate 500, an isotropic layer 510, and a birefringent layer 520. In the active prism structure 50 according to the present invention, the interface between the isotropic layer and the birefringent layer is configured to have a prism shape, and the prism may be configured in a single prism shape or in a prism array shape. The interface between the isotropic layer and the birefringent layer is configured such that the refractive index difference occurring at the interface between the isotropic layer and the birefringent layer is different according to the polarization direction of the incident light.

The structures and materials of the isotropic layer 510 and the birefringent layer 520 are the same as those of the first embodiment. However, by setting the relationship among the refractive index $n_p$ of the isotropic layer 510, the ordinary refractive index $n_o$ of the birefringent layer 520 which is a refractive index in the direction perpendicular to the alignment direction, and the extraordinary refractive index $n_e$ of the birefringent layer 520 which is a refractive index in the alignment direction so as to be $n_o<n_p<n_e$, the refraction angle in the prism structure and the degree of dispersion of light are different according to the polarization direction of the incident light, so that it is possible to control the size of a viewing angle.

In order to align the liquid crystal or photocurable liquid crystalline phase polymer constituting the birefringent layer in a unidirectional manner, it is preferable that the active prism structure 50 further includes a lower alignment film and/or an upper alignment film similarly to the first embodiment, and by the upper alignment film and/or the lower alignment film, the medium constituting the birefringent layer is aligned in a unidirectional manner.

Referring to (a) of FIG. 5, when light having directionality is incident on the active prism structure according to this embodiment, in the case where the polarization direction of the incident light is perpendicular to the alignment direction of the birefringent layer 520, the birefringent layer 520 has a refractive index of $n_o$, and since $n_p<n_o$, the incident light is refracted by the refractive index difference at the interface between the isotropic layer 510 and the birefringent layer 520, and thus, the active prism structure operates as a prism array so that the incident light disperses.

Referring to (b) of FIG. 5, when light having directionality is incident on the active prism structure according to this embodiment, in the case where the polarization direction of the incident light is coincident with the alignment direction of the birefringent layer 520, the birefringent layer 520 has a refractive index of $n_e$, and since $n_p<n_e$, the incident light is refracted by the refractive index difference at the interface between the isotropic layer 510 and the birefringent layer 520. As a result, in the case where light having a polarization direction coincident with the alignment direction of the birefringent layer is incident on the active prism structure according to this embodiment, the active prism structure operates as a prism array so that the incident light disperses.

However, in the active prism structure according to this embodiment, the refractive index difference between $n_p$ and $n_o$, which occurs in the case where the polarization direction of the incident light is perpendicular to the alignment direction of the birefringent layer, is smaller than the refractive index difference between $n_p$ and $n_e$, which occurs in the case where the polarization direction of the incident light is coincident with the alignment direction of the birefringent layer, the refraction angle and the degree of light dispersion are further reduced, so that the viewing angle is reduced. Therefore, in the active prism structure according to this embodiment, the degree of the refraction angle and the degree of light dispersion are different according to the polarization direction of the incident light, so that the viewing angle can be controlled.

On the other hand, in the active prism structure according to this embodiment, when light in a Lambertian form is incident on the active prism structure, both in the cases where the polarization direction of the incident light are parallel and perpendicular to the alignment direction of the birefringent layer, the active prism structure operates as a prism array, so that the viewing angle is reduced and increased, respectively. Therefore, in the active prism structure according to this embodiment, the viewing angle is changed according to the polarization direction of incident light, and as a result, it is possible to control the viewing angle by controlling the polarization direction of incident light.

Sixth Embodiment

Figure 6:
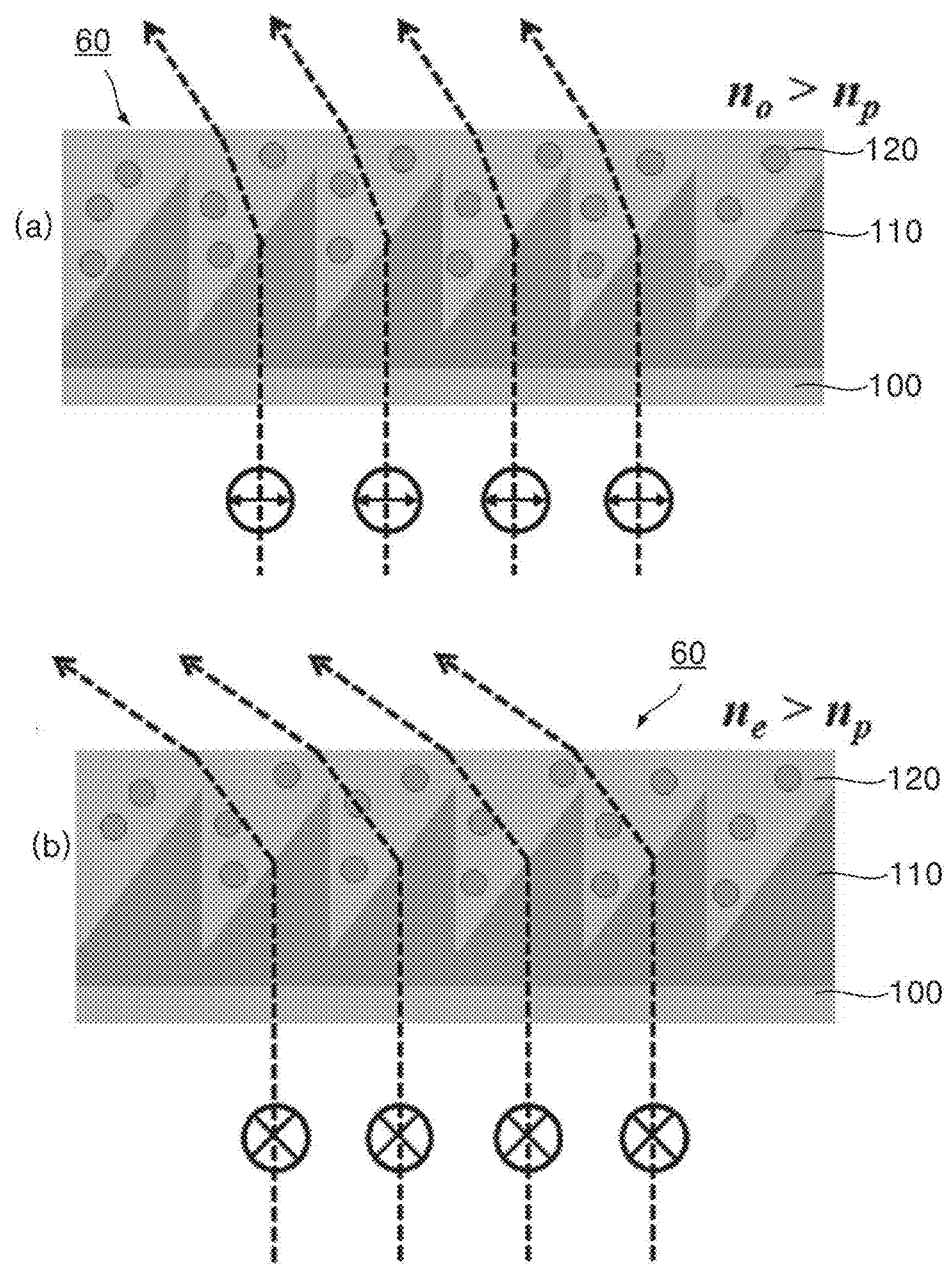
FIG. 6 illustrates a structure and operation principle of an active prism structure according to a sixth embodiment of the present invention, (a) of FIG. 6 illustrates refraction in the case where a polarization direction of incident light is perpendicular to an alignment direction of a birefringent layer, and (b) of FIG. 6 illustrates refraction in the case where the polarization direction of the incident light is coincident with the alignment direction of the birefringent layer.

Hereinafter, a structure and operations of an active prism structure according to a sixth embodiment of the present invention will be described in detail with reference to (a) and (b) of FIG. 6. (a) and (b) of FIG. 6 illustrate the structure and operation principle of the active prism structure according to the sixth embodiment of the present invention. (a) of FIG. 6 illustrates refraction in the case where a polarization direction of incident light is perpendicular to an alignment direction of a birefringent layer, and (b) of FIG. 6 illustrates refraction in the case where the polarization direction of the incident light is coincident with the alignment direction of the birefringent layer.

Referring to (a) and (b) of FIG. 6, an active prism structure 60 according to this embodiment includes a transparent substrate 600, an isotropic layer 610, and a birefringent layer 620. The active prism structure 60 according to this invention is configured such that an interface between the isotropic layer and the birefringent layer is formed in a prism array shape, and a refractive index difference occurring at the interface between the isotropic layer and the birefringent layer are different according to a polarization direction of the incident light.

It is preferable that the isotropic layer 610 and the birefringent layer 620 are made of the same material as those of the first embodiment and the interface between the isotropic layer and the birefringent layer is formed in a Fresnel prism shape having a right triangular shape.

The prism can be configured in a single prism shape or in a Fresnel prism array shape. By setting the relationship among the refractive index $n_p$ of the isotropic layer 610, the ordinary refractive index $n_o$ of the birefringent layer 620 which is a refractive index in the direction perpendicular to the alignment direction, and the extraordinary refractive index $n_e$ of the birefringent layer 620 which is a refractive index in the alignment direction so as to be $n_p<n_o<n_e$, the refraction angle and the degree of light refraction in the prism structure are different according to the polarization direction of the incident light. Therefore, in the prism structure according to the present invention, it is possible to control the refraction angle and the degree of light refraction of the prism structure by controlling the polarization direction of the incident light.

In order to align the liquid crystal or photocurable liquid crystalline phase polymer constituting the birefringent layer in a unidirectional manner, it is preferable that the active prism structure 60 further includes a lower alignment film and/or an upper alignment film similarly to the first embodiment, and by the upper alignment film and/or the lower alignment film, the medium constituting the birefringent layer is aligned in a unidirectional manner.

Referring to (a) of FIG. 6 when light having directionality is incident on the active prism structure according to this embodiment, in the case where the polarization direction of the incident light is perpendicular to the alignment direction of the birefringent layer 60, the birefringent layer 620 has a refractive index of $n_o$, and since $n_p<n_o$, the incident light is refracted by the refractive index difference at the interface between the isotropic layer 610 and the birefringent layer 620, and thus, the active prism structure operates as a Fresnel prism array so that the traveling path of the incident light is refracted.

Referring to (b) of FIG. 6, when light having directionality is incident on the active prism structure according to this embodiment, in the case where the polarization direction of the incident light is coincident with the alignment direction of the birefringent layer 620, the birefringent layer 620 has a refractive index of ne, and since $n_p<$ne, the incident light is refracted by the refractive index difference at the interface between the isotropic layer 610 and the birefringent layer 620. As a result, in the case where light having a polarization direction coincident with the alignment direction of the birefringent layer is incident on the active prism structure according to this embodiment, the active prism structure operates as a Fresnel prism array so that the traveling path of the incident light is refracted.

However, in the active prism structure according to this embodiment, the refractive index difference between $n_p$ and $n_o$, which occurs in the case where the polarization direction of the incident light is perpendicular to the alignment direction of the birefringent layer, is smaller than the refractive index difference between $n_p$ and $n_e$, which occurs in the case where the polarization direction of the incident light is coincident with the alignment direction of the birefringent layer, the refraction angle and the degree of light refraction are further reduced. Therefore, in the active prism structure according to this embodiment, the degree of refraction angle and the degree of light refraction are different according to the polarization direction of incident light. Accordingly, in the prism structure according to the present invention, it is possible to control the degree of refraction angle and the degree of light refraction of the prism structure by controlling the polarization direction of the incident light.

Method of Fabricating Active Prism Structure

Figure 7:
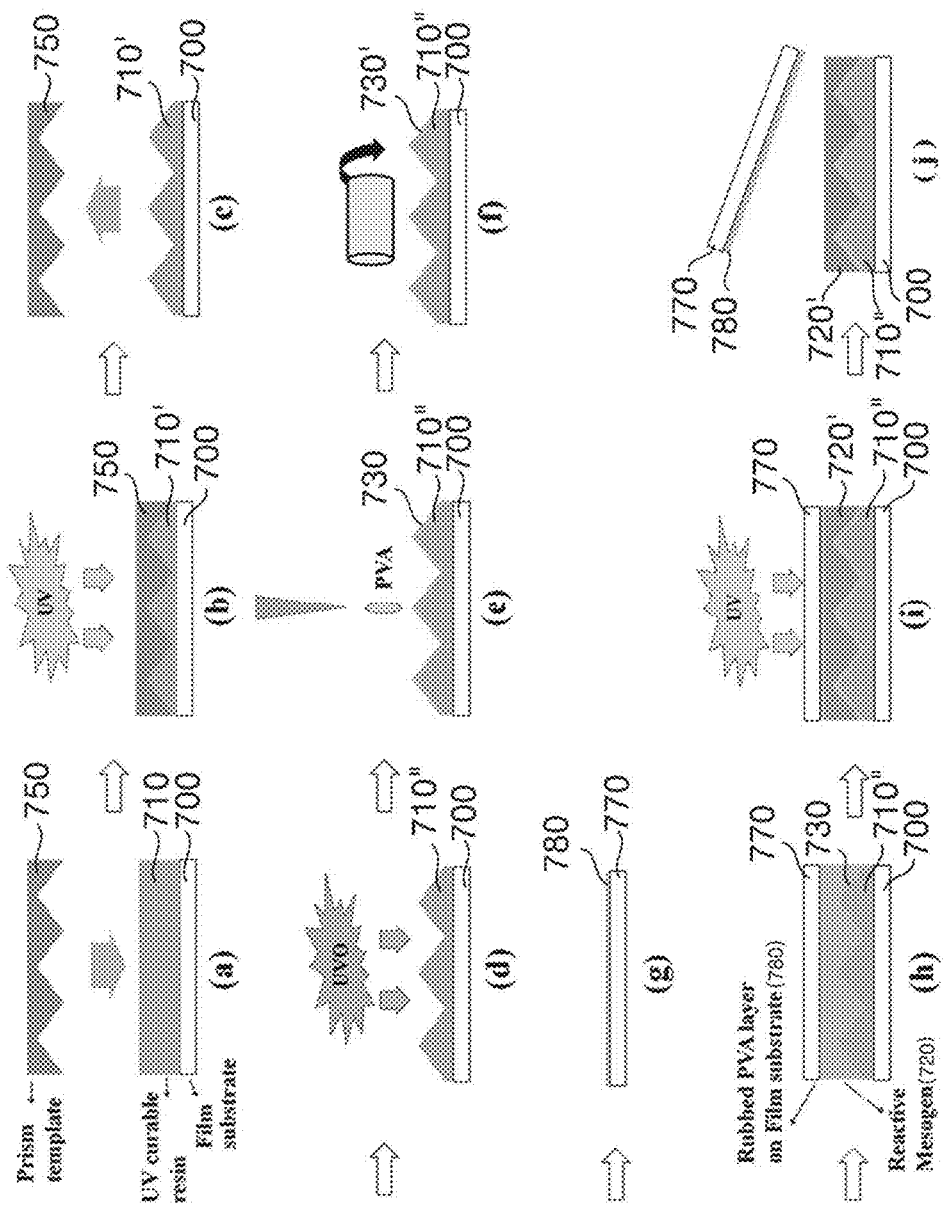
FIG. 7 is a flowchart sequentially illustrating a method of fabricating an active prism structure according to the present invention.

Hereinafter, a method of fabricating an active prism structure according to the present invention will be described in detail with reference to FIG. 7.

The method of fabricating an active prism structure according to the present invention includes depositing a photocurable isotropic polymer 710 on a lower transparent substrate 700 and then imprinting a prism array template 750 having a reversed prism shape (step a). Next, the photocurable isotropic polymers 710 are photocured by UV irradiation (step b), and the prism array template 750 is separated and removed (step c). As a result, an isotropic layer 710' having a prism array shape is formed on the lower transparent substrate 700 by using an imprinting process.

Next, before an alignment material is coated on the surface of the isotropic layer 710', it is preferable that the surface of the isotropic layer 710' is subjected to UVO treatment to hydrophilize the surface of the isotropic layer 710", so that coatability of the alignment material in post processes is improved (step d).

Next, an alignment material 730 is coated on the surface of the isotropic layer 710" (step e), and rubbing is performed in a unidirectional manner, so that a lower alignment film 730' for bottom-up alignment is formed on the isotropic layer 710' (step f). Polyvinylachol (PVA) can be used as an alignment material.

Next, an alignment material is coated on the upper transparent substrate 770, and rubbing is performed, an upper transparent substrate 770 having an upper alignment film 780 for top-down alignment is formed (step g).

Next, the upper transparent substrate 770 is arranged above the lower alignment film 730' on the lower transparent substrate 700, and a photocurable liquid crystalline phase polymer 720 is injected between the upper alignment film 730' and the upper alignment film 780 (step h). The photocurable liquid crystalline phase polymer 720 is photocured by UV irradiation, so that a birefringent layer 720' is formed (step i). The photocurable liquid crystalline phase polymer 720 constituting the birefringent layer is aligned in a unidirectional manner according to the alignment effect caused by the lower alignment film 730' and the upper alignment film 780. Next, the active prism structure according to the present invention is completed by separating removing the upper transparent substrate 770 and the upper alignment film 780 from the birefringent layer 720' (step j).

In the above-described fabricating method, the final step j may be omitted so that, if necessary, the upper transparent substrate 770 and the upper alignment film 780 may not be removed to complete the active prism structure.

On the other hand, in the case where the Fresnel prism shape is used for the prism array template of the above-described fabricating method, the active prism structure having the Fresnel prism shape according to the second, fourth, and sixth embodiments described above can be fabricated.

(a) of FIG. 8 is an SEM image of an isotropic prism array structure formed by the imprinting process in the fabricating method according to the present invention, and (b) of FIG. 8 is an SEM image of a cross-section of the active prism structure completed by the fabricating method according to the present invention. Referring to (a) of FIG. 8, the prism array template used in the imprinting process has a period of 18.5 μm, a height of 11 μm, and a prism angle $\theta_{prism}$ of 50 degrees. The photocurable isotropic polymer used is NOA89 having $n_p$=1.51 produced by Norland Products Inc. In (b) of FIG. 8, the active prism structure includes a lower transparent substrate 800, an isotropic layer 810 constituting a prism array structure, and a birefringent layer 820 stacked on the isotropic layer. The photocurable liquid crystalline phase polymer constituting the birefringent layer is RMM727 produced by Merck.

(a) and (b) of FIG. 9 are microscope images observed on a crossed polarizer in an active prism structure according to the present invention. It can be seen from (a) and (b) of FIG. 9 through a polarizing microscope on the crossed polarizer that the birefringent layer made of the photocurable liquid crystalline phase polymer of the active prism structure is aligned.

Referring to (a) of FIG. 9, when the polarizer direction and the alignment direction of the photocurable liquid crystalline phase polymer are coincident with each other, no phase retardation occurs, and thus, a dark state appears on the crossed polarizer. Referring to (b) of FIG. 9, when a difference between the polarizer direction and the alignment direction of the photocurable liquid crystalline phase polymer is 45 degrees, phase retardation occurs due to the birefringence of the photocurable liquid crystalline phase polymer layer, and thus, light on the crossed polarizer is leaked. Due to the prism structure, as the height differs, the degree of phase retardation varies depending on the position.

Therefore, it can be understood that the degree of light leakage is different according to the position.

(a) to (c) of FIG. 10 are photographs illustrating traveling paths of light after passing through a Fresnel type active prism structure according to the present invention according to polarization of incident light in the Fresnel type active prism structure.

Referring to (a) to (c) of FIG. 10, in the Fresnel type active prism structure according to the present invention, it can be seen that the traveling path of light is changed according to the polarization direction of the incident light. In the active prism structure of the Fresnel prism shape used for the observation of (a) and (b) of FIG. 10, the period of the prism array template having a Fresnel prism shape is 1 mm, and the prism angle is 15 degrees. Referring to (a) of FIG. 10, in the case where 0-degree polarized light is incident, that is, in the case where the polarization direction of the incident light is perpendicular to the alignment direction of the birefringent layer, the birefringent layer has a refractive index of $n_o$, and since $n_p = n_o$, the incident light goes straight without refraction.

Referring to (c) of FIG. 10, in the case where 90-degree polarized light is incident, that is, in the case where the polarization direction of the incident light is coincident with the alignment direction of the birefringent layer, the birefringent layer has a refractive index of $n_e$, and since $n_p < n_e$, the incident light is refracted by the refractive index difference at the interface between the isotropic layer and the birefringent layer, and the active prism structure operates as a Fresnel prism array, so that the traveling path of the light going straight is refracted.

Referring to (b) of FIG. 10, in the case where 45-degree polarized light is incident, the x-axis polarized component and the y-axis polarized component are present at a ratio of 1:1, and thus, the x-axis polarize component goes straight without refraction, and the y-axis polarize component is refracted, so that the traveling path is refracted. Thus, all the light with two traveling paths is observed.

While the present invention has been particularly illustrated and described with reference to exemplary embodiments thereof, it should be understood by the skilled in the art that the invention is not limited to the disclosed embodiments, but various modifications and applications not illustrated in the above description can be made without departing from the spirit of the invention. In addition, differences relating to the modifications and applications should be construed as being included within the scope of the invention as set forth in the appended claims.

What is claimed is:

1. An active prism structure comprising:
a substrate made of a transparent material;
an isotropic layer stacked on the substrate and made of a photocurable isotropic polymer having a predetermined refractive index $n_p$; and
a birefringent layer stacked on the isotropic layer and made of a birefringent material having an ordinary refractive index $n_o$ and an extraordinary refractive index $n_e$,
wherein the predetermined refractive index $n_p$ is different from the ordinary refractive index $n_o$ and the extraordinary refractive index $n_e$,
wherein a refraction angle and a refraction direction of a prism are determined according to a polarization direction of an incident light,
wherein an interface between the isotropic layer and the birefringent layer is formed in a prism shape, and
wherein refractive index differences occurring at the interface between the isotropic layer and the birefringent layer are different according to the polarization direction of the incident light.

2. The active prism structure according to claim 1, wherein the birefringent material includes a birefringent liquid crystal or a photocurable liquid crystalline phase polymer.

3. The active prism structure according to claim 1, further comprising a lower alignment film formed at the interface between the birefringent layer and the isotropic layer,
wherein the birefringent material is aligned by the lower alignment film.

4. The active prism structure according to claim 1, further comprising an upper transparent substrate stacked on a surface of the birefringent layer,
wherein an upper alignment film is formed on one surface of the upper transparent substrate being in contact with the birefringent layer, and
wherein the birefringent material is aligned by the upper alignment film.

5. The active prism structure according to claim 1, wherein the prism is formed at the interface between the isotropic layer and the birefringent layer and is configured to have a triangular shape, and the prism is configured as a single prism or a prism array.

6. The active prism structure according to claim 1, wherein the prism is formed at the interface between the isotropic layer and the birefringent layer and is configured as a single prism having a right triangular shape or a prism array having a Fresnel prism shape.

7. A method of fabricating an active prism structure, comprising:
(a) forming an isotropic layer on a first transparent substrate by depositing an isotropic polymer on the first transparent substrate, pressing the deposited isotropic polymer by using a prism template having a reversed prism shape, photocuring the pressed isotropic polymer, and removing the prism template;
(b) forming a lower alignment film for bottom-up alignment on a surface of the isotropic layer by coating an alignment material on the surface of the isotropic layer and performing rubbing;
(c) forming an upper substrate having an upper alignment film for top-down alignment by coating an alignment material on a second transparent substrate and performing rubbing;
(d) forming a birefringent layer by arranging the upper substrate above the lower alignment film on the first transparent substrate, injecting a photocurable liquid crystalline phase polymer between the lower alignment film and the upper alignment film, and performing photocuring; and
(e) separating and removing the upper substrate having the upper alignment film from the birefringent layer,
wherein an interface between the isotropic layer and the birefringent layer is configured as a prism shape, and
wherein the isotropic polymer and the photocurable liquid crystalline phase polymer are configured as materials so that refractive index differences occurring at the interface between the isotropic layer and the birefringent layer are different according to a polarization direction of incident light.

8. The method according to claim 7, wherein the (b) forming the lower alignment film further includes a process of UVO-treating the surface of the isotropic layer before coating the alignment material on the surface of the isotropic layer, so that coatability of the alignment material is improved.

9. The method according to claim 7, wherein the isotropic polymer includes a photocurable isotropic polymer having a refractive index $n_p$ equal to an ordinary refractive index of the birefringent layer, and control of turning on/off a prism function is determined according to the polarization direction of the incident light.

10. The method according to claim 7, wherein the isotropic polymer includes a photocurable isotropic polymer having a refractive index $n_p$ different from an ordinary refractive index and an extraordinary refractive index of the birefringent layer, and a refraction angle and a refraction direction of a prism are determined according to the polarization direction of the incident light.

11. The method according to claim 7, wherein the prism template is configured as a single prism template or a prism array template, and
wherein the prism template is configured to form a triangular shape or a Fresnel prism shape.

* * * * *